(12) United States Patent
Bauer et al.

(10) Patent No.: US 7,082,115 B2
(45) Date of Patent: Jul. 25, 2006

(54) RADIO TELECOMMUNICATIONS SYSTEM WITH IMPROVED USE OF TIMESLOTS

(75) Inventors: Norbert Alfred Bauer, Bayem (DE); Andrea Giustina, Swindon (GB); Martine Madelaine Herpers, Herzogenaurach (DE)

(73) Assignee: Lucent Technologies Inc., Murray Hill, NJ (US)

( * ) Notice: Subject to any disclaimer, the term of this patent is extended or adjusted under 35 U.S.C. 154(b) by 778 days.

(21) Appl. No.: 09/797,366

(22) Filed: Mar. 1, 2001

(65) Prior Publication Data
US 2001/0036194 A1   Nov. 1, 2001

(30) Foreign Application Priority Data
Mar. 7, 2000   (EP)   .................................. 00301868

(51) Int. Cl.
*H04J 3/00* (2006.01)
(52) U.S. Cl. ...................................... 370/336; 370/412
(58) Field of Classification Search ................ 370/328, 370/329, 336, 337, 338, 412
See application file for complete search history.

(56) References Cited

U.S. PATENT DOCUMENTS

| 4,949,395 | A  | * | 8/1990  | Rydbeck ..................... 370/435 |
| 5,729,534 | A  | * | 3/1998  | Jokinen et al. ............. 370/280 |
| 5,748,624 | A  | * | 5/1998  | Kondo ........................ 370/347 |
| 5,956,329 | A  | * | 9/1999  | Pernice et al. ............. 370/336 |
| 5,999,534 | A  |   | 12/1999 | Kim ........................... 370/395 |
| 6,408,007 | B1 | * | 6/2002  | Park .......................... 370/412 |
| 6,614,777 | B1 | * | 9/2003  | Menzel et al. ............. 370/347 |

FOREIGN PATENT DOCUMENTS

| EP | 0 710 046 A2 | 9/1995 |
| EP | 0 936 834 A2 | 2/1999 |
| WO | WO97/09836 | 3/1997 |

OTHER PUBLICATIONS

European Search Report dated Aug. 8, 2000.

\* cited by examiner

*Primary Examiner*—Huy D. Vu
*Assistant Examiner*—Christine Ng

(57) ABSTRACT

A packet control unit for a radio telecommunications system such as GPRS has a radio link control/medium access control blocks scheduler which allocates a number of temporary block flow queues to a timeslot for transmission to a mobile system; a fixed allocation table is provided having allocation slots corresponding to RAC blocks, and the RAC blocks scheduler reads the table cyclically and allocates slots according to the reading. Timeslots are requested later during increased demand conditions and are released earlier during decreasing demand conditions than in currently known arrangements.

9 Claims, 4 Drawing Sheets

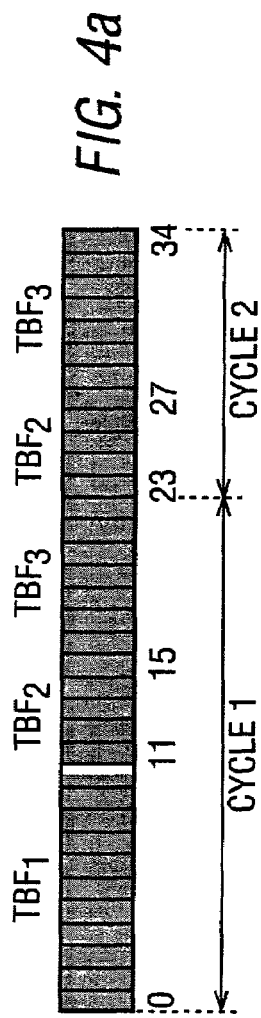
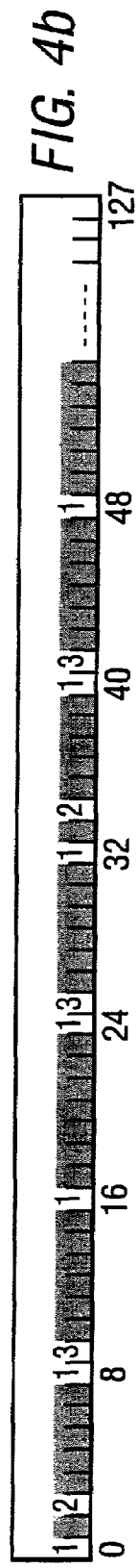
FIG. 4a
FIG. 4b
FIG. 4c
Spare = grey slots (100 slot)
$TBF_1 = 1$ (16 slots)
$TBF_2 = 2$ (4 slots)
$TBF_3 = 3$ (8 slots)

RADIO TELECOMMUNICATIONS SYSTEM WITH IMPROVED USE OF TIMESLOTS

CROSS-REFERENCE TO RELATED APPLICATION

This application claims priority of European Patent Application No. 00301868.6, which was filed on Mar. 7, 2000.

1. Field of the Invention

This invention relates to a packet-based radio telecommunications system, such as GSM (Global System for Mobile Communications), having improved traffic control, especially over the air interface, and relates especially to a Packet Control Unit (PCU) in the Base Transceiver Station (BTS) having improved interworking with Mobile Stations (MSs) and with the Serving GPRS Support Node (SGSN).

2. Description of the Related Art

In a known packet-based system, a practical problem is that the PCU can only react on demand to packets received, and is not aware of traffic it will receive in future. The question is how to allocate resources on the air interface which carries GSM voice calls, control links, and timeslots. In current systems, the bit rate, the priority and the delay applied to each GPRS connection can be varied, but this requires considerable computing and messaging resources between the MS and the BTS, between the BTS and the PCU, and between the PCU and the SGSN.

The blocking rate of a packet-based system is the proportion of users who are trying to access the system but cannot immediately be served; the rate can never be zero, which implies infinite resources, and practical experience shows that a blocking rate of 5% generates a substantial level of caller complaints. A blocking rate of 2% has been found to be acceptable, and a maximum number of GPRS transmissions can then be served. It is desirable to improve the traffic control of the system by using the timeslots more efficiently while maintaining the blocking rate of the system at an acceptable level.

SUMMARY OF THE INVENTION

According to the invention, a packet control unit for a radio telecommunications system comprises a down link requests scheduler; a base station system virtual connection flow controller; a mobile system flow controller; a first data transmission means to exchange data with a plurality of mobile systems; and a second data transmission means to exchange data with the serving support node of the radio telecommunications system; there being associated with the first transmission means a queuing means to provide a plurality of temporary block flow queues, and a radio link control/medium access control blocks scheduler having allocation means arranged to allocate a temporary block flow queue to a timeslot for transmission to a mobile system only when that queue contains data. Optionally each timeslot is essentially filled with data before transmission.

BRIEF DESCRIPTION OF THE DRAWINGS

The features and advantages of the present invention will become more apparent from the detailed description set forth below when taken in conjunction with the drawings wherein:

FIG. 4a illustrates the resulting data stream on the link to the MSs in block form;

FIG. 4b illustrates the scheduling table allocation; and

FIG. 4c illustrates the resulting interleaved data stream to the MSs.

DETAILED DESCRIPTION

Figure 1:
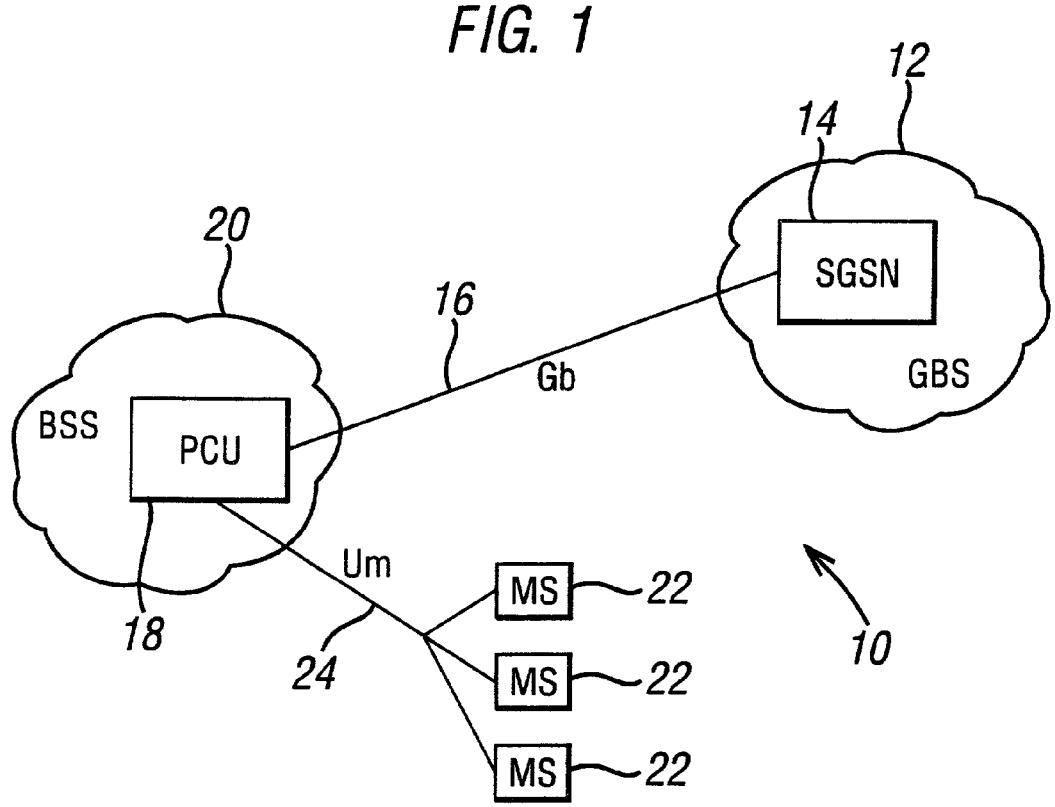
FIG. 1 is a schematic illustration of the BSS part of the GPRS radio telecommunications system.

In FIG. 1 a General Packet Radio Service (GPRS) system 10 comprises a GPRS Backbone System (GBS) 12 containing a Serving GPRS Node (SGSN) 14 which is connected by an interface link Gb 16 to a Packet Control Unit (PCU) 18 within a Base Station System (BSS) 20. The PCU 18 is connected to a number of Mobile Systems (MS) 22 through an interface link Um 24.

Figure 2:
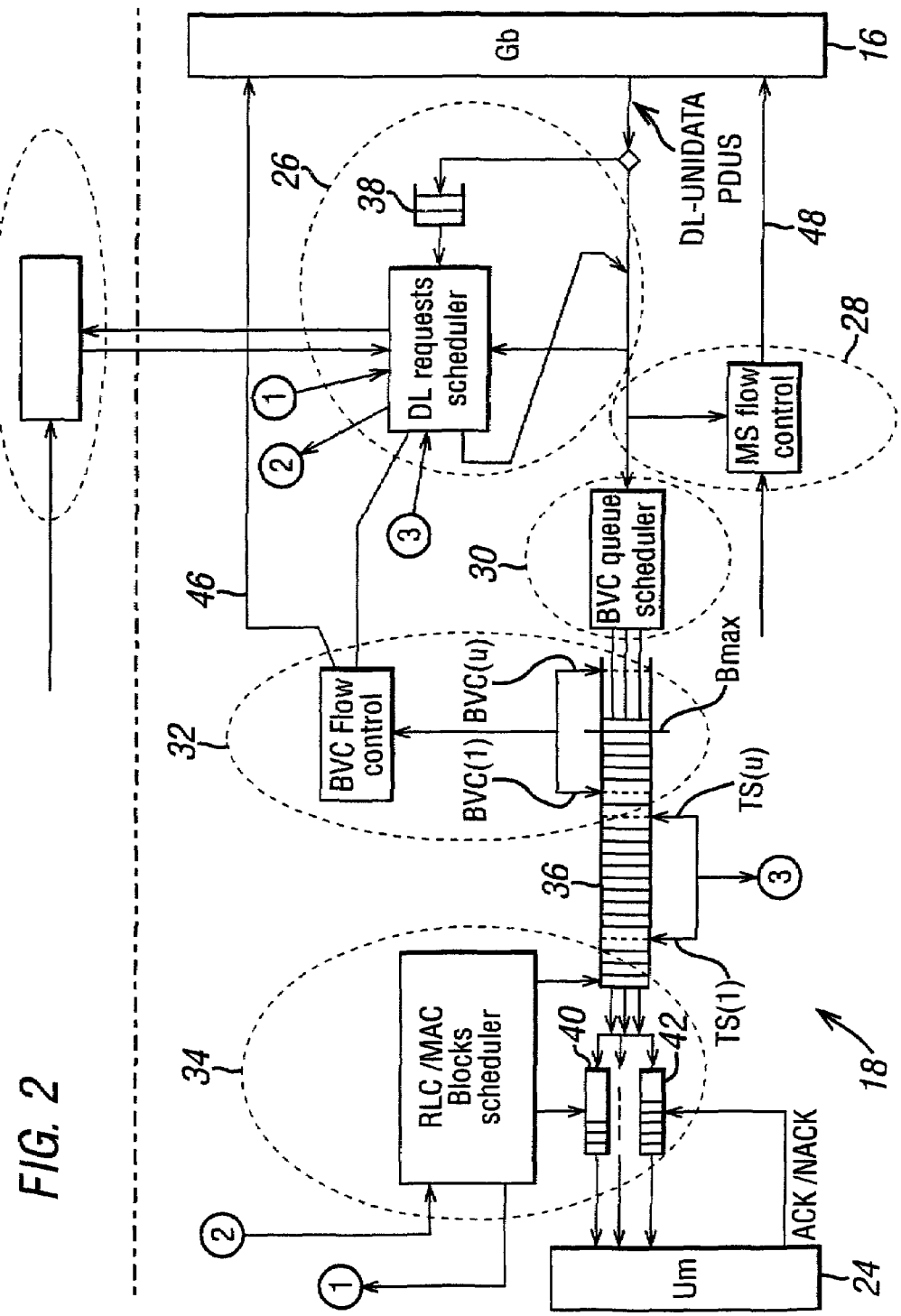
FIG. 2 is a schematic illustration of the packet control unit of a radio telecommunications system.

In FIG. 2 the PCU 18, the link Gb 16, and the link Um 24 are shown. Between the links 16 and 24 there is a Down Link (DL) requests scheduler 26, a MS flow control unit 28, a Base Station System Virtual Connection (BVC) queue scheduler 30; a BVC flow controller 32, and a Radio Link Control/Medium Access Control (RLC/MAC) blocks scheduler 34.

Although the uplink is not illustrated as it is not actively involved in application of the present invention, it will naturally exist.

In normal operation at normal traffic flow rates, a new call to a MS 22 is received over the Gb link 16, and the first Protocol Data Unit DL-UNITDATA PDU passes to the queue 38 of the DL requests scheduler 26. The scheduler 26 instructs the RLC/MAC blocks scheduler 34 to allocate capacity, and a Temporary Block Flow (TBF) queue, such as queue 42, is set up for the called mobile. Signals pass over the Um link 24 to the called mobile, which returns acknowledgement signals, ACK, over link 24 to the queue 42. The scheduler 34 fetches the next DL-UNITDATA PDU which, because the MS is now known, passes through the BVC queue scheduler 30 into the BVC queue 36, and then to the appropriate TBF queue, queue 42 in this example.

The scheduler 26 assigns logical resources to one of the TBF queues 40, 42, and instructs the RLC/MAC block scheduler, message (2)—(2). The processor 28 reads from the second DL-UNITDATA PDU the multi slot capacity of the mobile.

One TBF queue is allocated to each active MS. Every MS with an active TBF queue has two logical queues; one is for Logical Link Layer (LLC) data PDUs, and one is for LLC signaling PDUs. The length of the BVC queue 36 is the sum of all the MS queues including LLC data and signalling.

The BVC queue 36 is provided towards its output end with two timeslot triggers TS(l) and TS(u) which function in the conventional way, that is, if the queue 36 exceeds the upper timeslot trigger TS(u), the DL requests scheduler 36 sends a request via interface Gb 16 to the SGSN 14 for an additional timeslot to be allocated. If an additional timeslot is allocated, the queue shortens as traffic throughput is increased, and the queue length falls below the upper trigger TS(u). The signal from the queue 36 to the scheduler 26 is indicated as message (3)—(3).

In the arrangement of FIG. 2, the major components illustrated perform their conventional functions as follows:

The DL requests scheduler 26 allocates resources, i.e. it decides which is the next MS 22 to be connected over the link 24; it requests additional timeslots when the timeslot trigger TS(u) is activated on connection (3)—(3),and it returns timeslots when they are no longer required.

The RLC/MAC blocks scheduler 34 allocates capacity, i.e. it allocates timeslots in response to instructions from the DL scheduler 36, message (2)—(2); it fetches the next DL PDU when the TBF queue 40, 42 (or that MS is below a predetermined threshold (precedence is given to LLC signaling PDUs). The scheduler 34 also divides the LLC PDU into blocks, sets up transmission windows and retransmissions of blocks for each TBF queue 40, 42, and drops the TBF after a predetermined number of resent transmissions; on termination of a call it also signals the end of a TBF queue to the DL scheduler 36, message (1)—(1).

The DL requests scheduler 26 and the RLC/MAC blocks scheduler 34 are related as follows; the scheduler 26 assigns logical resources to each TBF queue 40, 42 on a per timeslot basis, i.e. an allocation table is set up, while the scheduler 34 dynamically maps these logical resources to physical resources. Looked at another way, the scheduler 26 decides which mobile 22 will next be connected, and the scheduler 34 decides which block of information is sent to which mobile.

The BVC queue scheduler 30 selects the appropriate queue for a mobile system. It directs each DL-UNITDATA PDU to that queue. Each MS queue is divided into an MS data queue and an MS signaling queue—conveniently via use of two pointers in a common buffer.

Data flow over the Gb link 16 is controlled by use of the leaky bucket algorithm run within the SGSN 14 (FIG. 1). Values of Bmax, the maximum bucket capacity and R the leak rate, are calculated by both the BVC flow control processor 32 and the MS flow control processor 28 in different circumstances, and the values sent over the Gb link 16.

The following assumptions are made about the SGSN 14:

1. The MS flow control values sent to the SGSN by the MS flow control processor 28 are valid until the SGSN 14 receives a new valid MS flow control message or until the hysteresis timer Th expires. The PCU 18 knows the timer value which the SGSN is using and is arranged to send a new MS flow control message every Th seconds less a short tolerance time.

2. If the SGSN 14 has not received an MS flow control message for a particular MS, the SGSN uses the default flow control values as sent in every BVC flow control message. The SGSN never uses internally generated MS flow control values, when these initial values are sent in the BVC flow control message.

3. The SGSN 14 sends the MS Radio Access Capability (a class mark) in each DL-UNITDATA PDU.

4. The SGSN 14 keeps (logical) separated queues for both MS flow control and BVC flow control.

Figure 3:
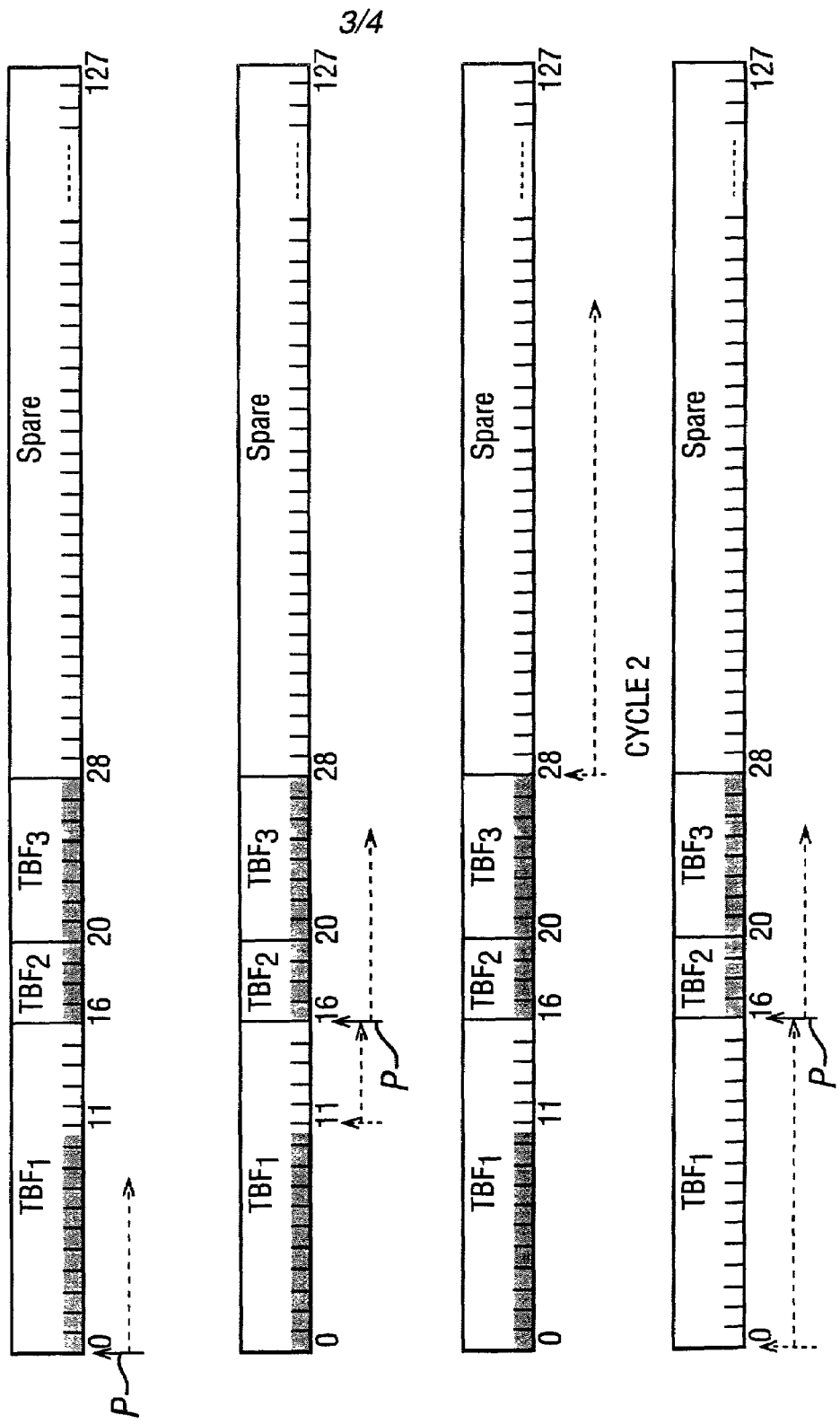
FIG. 3 indicates two cycles of data transfer for the TBF queues.

Turning now to detailed consideration of the inventive feature, the RLC/MAC scheduler 34 controls the TBF queues 40, 42 etc by setting up an allocation table having 128 scheduling slots 0–127. Each slot corresponds potentially to one RLC/MAC block. This is shown in FIG. 3 in which three temporary block flows TBF 1, 2 and 3 are considered, each set of allocated slots being a different length and being shown shaded. As is highly probable in practice, many of the slots are unallocated. Since the DL requests scheduler has the same number of slots and the same type of scheduling table, no translation is needed in communication with the RLC/MAC scheduler 34.

A pointer P reads each slot and the scheduler sends data for the appropriate TBF. The arrangement according to the invention is such that if there is no data to send for a particular TBF, the scheduler skips those slots and looks for the next TBF having data to send. After slot 127, the pointer returns to 0, i.e., scheduling is circular.

In FIG. 3, in Cycle 1, the pointer P starts at slot 0 and finds that all of the slots 0–10 of TBF1 have data, this data is then sent by the RLC/MAC 34. At slot 11, there is no data, and the scheduler moves the pointer to the next data-containing slot, i.e., slot 16. TBF2 has data to send, and slots 16 to 19 are read; TBF3 has data to send in slots 20 to 27, and these data are sent. At slot 28 there is no data, and the scheduler scans all the further slots until the pointer reaches 0, when Cycle 2 of reading the scheduling slots begins.

In Cycle 2, TBF1 now has no data to send, but TBF2 and TBF3 have data in slots 16 to 19 and 20 to 27 as before, which is read and sent.

FIG. 4a shows the combined data; no RLC/MAC blocks are wasted, except that a small amount of radio source is wasted due to the internal fragmentation of the last, partial block of TBF1 in slot 10. The numbers of the scheduling slots are maintained to improve readability.

It will be clear that consecutive cycles can have different lengths and will normally be shorter than 128 scheduling blocks. The allocation of TBFs is shown as consecutive for simplicity.

FIG. 4b shows a real allocation in a scheduling table; the allocation is as follows:

TBF1=1 (16 slots)
TBF2=2 (4 slots)
TBF3=3 (8 slots)
Spare=grey (100 slots)

It can be seen that the scheduling slots for each TBF are not consecutive.

The allocation table is updated only when a user starts or ends transmission.

FIG. 4c illustrates the resulting data stream on the Um link 24; there are no spare RLC/MAC blocks, thus the use of simple statistical scheduling according to the invention results in highly efficient use of the Um link 24 and full use of every timeslot. Thus a timeslot can be released more quickly than would be the case in currently known arrangements, and a timeslot will be requested at a later stage in increasing demand conditions than would be the case in currently known arrangements.

A general result of application of the invention is that there is fair scheduling of resources among the MSs, and different bit rate requirements for coexisting TBFs are served; this is achieved without any real time control of throughput, and only by reading of a stable allocation table.

While this invention has been particularly shown and described with reference to a preferred embodiment thereof, it will be understood by those skilled in the art that various changes and modifications in form and details may be made without departing from the scope and spirit of the invention as defined in the appended claims. Accordingly, it is intended that the appended claims cover any such modifications or embodiments that fall within the scope of the invention.

What is claimed is:

1. A packet control unit for a radio telecommunications system comprising a radio link control/medium access control blocks scheduler; first data transmission means to exchange data with a plurality of mobile systems; and second data transmission means to exchange data with a serving support node of the system; there being associated with the first transmission means a queuing means to provide a plurality of temporary block flow queues and a fixed allocation table having allocation slots corresponding to radio access control blocks, the table being cyclically read by the radio access control blocks scheduler, and radio link control/medium access control blocks being reserved in accordance with the cyclical reading, wherein a pointer (P) is arranged to jump from the last item of data in one temporary block flow queue (TBF1) to the next temporary block flow queue (TBF2) in the cycle which contains data.

2. The packet control unit of claim 1 in which the allocation table is prepared by a downlink requests scheduler in the unit.

3. The packet control unit of claim 1 in which the allocation is arranged so that every radio block on a timeslot is essentially filled with data before transmission.

4. The packet control unit of claim 1 in which each temporary block flow queue is allocated the full capacity of a timeslot when the queue is the only queue active in that timeslot.

5. The packet control unit of claim 1 wherein the radio access control block scheduler is arranged to achieve the desired bit rate without real-time control.

6. A packet control unit for a radio telecommunications system comprising a radio link control/medium access control blocks scheduler; first data transmission means to exchange data with a plurality of mobile systems; and second data transmission means to exchange data with a serving support node of the system; there being associated with the first transmission means a queuing means to provide a plurality of temporary block flow queues and a fixed allocation table having allocation slots corresponding to radio access control blocks, the table being cyclically read by the radio access control blocks scheduler, and radio link control/medium access control blocks being reserved in accordance with the cyclical reading, wherein the radio access control block scheduler is arranged to achieve the desired bit rate without real-time control, wherein a pointer (P) is arranged to jump from the last item of data in one temporary block flow queue (TBF1) to the next temporary block flow queue (TBF2) in the cycle which contains data.

7. The packet control unit of claim 6 in which the allocation table is prepared by a downlink requests scheduler in the unit.

8. The packet control unit of claim 6 in which the allocation is arranged so that every radio block on a timeslot is essentially filled with data before transmission.

9. The packet control unit of claim 6 in which each temporary block flow queue is allocated the full capacity of a timeslot when the queue is the only queue active in that timeslot.

* * * * *